Patented Dec. 14, 1948

2,456,028

UNITED STATES PATENT OFFICE 2,456,028

FLUOROCARBON COMPOUND

Joseph H. Simons, State College, Pa., assignor to Minnesota Mining & Manufacturing Company, St. Paul, Minn., a corporation of Delaware No Drawing. Application December 3, 1947, Serial No. 789,553

1 Claim. (Cl. 260—648)

This application is a continuation-in-part of my copending application Ser. No. 529,182, filed on April 1, 1944, as a continuation-in-part of my application Ser. No. 237,157, filed on October 26, 1938, now abandoned. It is also a continuation-in-part of divisional application Ser. No. 684,785, filed on July 19, 1946.

This application relates to my discovery of the volatile liquid alicyclic fluorocarbon compound $C_5F_{10}$, which consists exclusively of carbon and fluorine, and which has the structural formula:

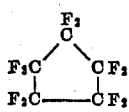

A relatively pure sample of this compound, which was isolated from a complex reaction product mixture of cyclic and non-cyclic fluorocarbons prepared as described in the subsequent example, was found to have the following measured physical properties:

Boiling point _____°C__ 21 to 22
Freezing point _____°C__ 9.9 to 10.2
Liquid density (grams per c. c. at 20° C.) __ 1.648
Surface tension (dynes per cm. at 20° C.) ___ 11.3

The molecular weight calculated from the formula is 250; while the molecular weight of the sample as calculated from the vapor density was found to be 249. The formula was also verified by analysis of fluorine content; the measured value of 76.0% agreeing with the theoretical value of 76.0%. The Raman spectrum and the electron diffraction of this compound give simple patterns confirming the assigned molecular structure in which there are no side groups, all carbon atoms being in the ring. The relatively high freezing point also indicates a symmetrical ring structure. An open chain structure is conclusively precluded by the molecular weight and fluorine analysis.

This fluorocarbon compound is colorless, odorless, non-toxic, non-corrosive, and has a high degree of chemical inertness and thermal stability. It does not react with strong acid or with strong alkali at ordinary temperatures. It does not hydrolyze with water. It does not burn or react with oxygen. It does not react with any of the metals at ordinary temperatures and reacts only with the more chemically active metals, such as sodium, at elevated temperatures. It can be heated to high temperatures in "Pyrex" laboratory type glassware without reacting or decomposing. The great stability of this compound is especially surprising in view of the fact that it has five carbon atoms in the ring.

This compound has utility for various purposes for which its unique physical and chemical properties lend particular fitness. Thus it is useful as a fire extinguisher, as a low boiling point inert solvent, and as a heat transfer medium.

My discovery of this novel fluorocarbon compound resulted from an experiment in which mercury was unintentionally present in a copper reaction tube in which heated carbon was being reacted with fluorine gas. Unexpected results were obtained, different from those obtained when mercury was not present. I found that the mercury (converted to mercury fluoride by the fluorine), altered the reaction mechanism and resulted in the formation of hitherto unknown fluorocarbons, at reaction chamber temperatures roughly between 200° and 600° C. The mercury fluoride serves as a catalyst but the effect is not to merely alter the formation rates of fluorocarbon compounds, but to bring about a different type of reaction mechanism. One of the novel fluorocarbon compounds which was isolated from the reaction product mixture of this new process, was the alicyclic 5-carbon compound claimed herein.

To the best of my knowledge and belief, no cyclic fluorocarbon of any kind had previously been established by others; although several foreign chemists had speculated in their writings as to the possible presence of cyclic 6-carbon fluorocarbons in complex mixtures obtained in their experiments, but without ever succeeding in obtaining any substantiation so far as the literature shows.

Process example

This example illustrates a process of making the new compound $C_5F_{10}$. The description is of an experiment wherein a relatively pure sample was isolated, having the measured properties previously set forth. In this work a sample was obtained which had a higher degree of purity than the samples obtained in earlier experiments described in the parent applications, listed in the first paragraph of this specification, to which reference may be made. In particular this permitted of obtaining more precise values for the freezing point and liquid density.

The reaction vessel was a horizontal iron pipe approximately 48 inches long and 2 inches in diameter, closed at each end except for inlet and outlet connections. It was covered with asbestos paper, and wound with 16 gauge Nichrome wire to provide for electric resistance heating, which in turn was covered with magnesia insulation about one inch thick. A sheet iron tray of the same length, extending across the pipe near the axis, was employed for holding the carbon powder. The fluorine inlet tube extended over one end of the tray. Thermocouples were inserted in the pipe, below the tray, for temperature observation. Operation was continuous except for replacement of carbon. Each charge consisted of 250 grams of "Norit" carbon containing 5% by weight of thoroughly admixed powdered mercury fluoride ($HgF_2$) as catalyst.

The temperature of the vessel was held between 350° and 385° C. The reaction zone, in which fluorine reacted with carbon, was a relatively narrow region, starting at the fluorine inlet and progressing toward the outlet end of the pipe as the carbon was consumed. The products in vapor state were led through a tube to a copper collecting vessel immersed in a mixture of solid-$CO_2$ and acetone contained in a Dewar flask, where all but the lowest-boiling gaseous compounds were condensed.

Separation of the $C_5F_{10}$ compound was made by distillation in fractionating columns followed by fractional freezing to effect final purification.

The primary distillation fractions having boiling point ranges of 5 to 42° C. and 42 to 57° C. were combined and refractionated. A fraction consisting primarily of $C_5F_{10}$, as indicated by boiling point, was obtained. The properties of this fraction indicated a relatively low-melting contaminant. Fractional freezing was found effective for purification. A 500 c. c. glass vessel filled with copper wool to provide temperature distribution, and containing a thermometer, was connected to a vacuum system which included a twelve liter bulb for gas capacity. A sample of 360 grams of the crude $C_5F_{10}$ was placed in the vessel and thoroughly degassed by alternate vaporization, condensation and pumping. The material was frozen by means of a chilling bath in which the vessel was immersed, and was then allowed to warm slowly. When liquid appeared, connection to the evacuated bulb was opened to evaporate the liquid. This was repeated until 190 grams of solid material remained, which had a melting point of 9.9 to 10.2° C. The vapor pressure was 464 mm. at the first sign of liquid and 470 mm. at the end of melting, indicating a relatively pure material. This purified $C_5F_{10}$ compound was analyzed and the molecular weight was determined, and measurements were made of boiling point, liquid density and surface tension, with the results previously set forth.

I claim:

The alicyclic fluorocarbon compound $C_5F_{10}$, having five carbon atoms in the ring.

JOSEPH H. SIMONS.

REFERENCES CITED

The following references are of record in the file of this patent:

Simons et al., "Jour. Am. Chem. Soc.," vol. 61, pages 2962–6 (1939).